(12) United States Patent
Basford

(10) Patent No.: US 6,959,958 B2
(45) Date of Patent: Nov. 1, 2005

(54) AERODYNAMIC COMBINATION FOR IMPROVED BASE DRAG REDUCTION

(76) Inventor: William C. Basford, 17 River Rd., Benton, ME (US) 04901

( * ) Notice: Subject to any disclaimer, the term of this patent is extended or adjusted under 35 U.S.C. 154(b) by 0 days.

(21) Appl. No.: 09/877,585

(22) Filed: Jun. 8, 2001

(65) Prior Publication Data

US 2002/0030384 A1 Mar. 14, 2002

Related U.S. Application Data

(60) Provisional application No. 60/210,325, filed on Jun. 9, 2000, and provisional application No. 60/275,059, filed on Mar. 12, 2001.

(51) Int. Cl.[7] .................................................. B60J 1/00
(52) U.S. Cl. ............................... 296/180.1; 296/180.4; 296/180.2
(58) Field of Search .......................... 296/180.1, 180.4, 296/180.2, 180.3, 181, 91

(56) References Cited

U.S. PATENT DOCUMENTS

| | | | | | |
|---|---|---|---|---|---|
| 609,789 | A | * | 8/1898 | Capewell | 296/180.5 |
| 2,737,411 | A | * | 3/1956 | Potter | 296/180.4 |
| 2,800,291 | A | * | 7/1957 | Stephens | 114/67 R |
| 3,999,797 | A | * | 12/1976 | Kirsch et al. | 296/180.4 |
| 4,131,309 | A | * | 12/1978 | Henke | 296/180.2 |

(Continued)

OTHER PUBLICATIONS

Sighard Hoerner, "Fluid–Dynamic Drag", Self Published by the author, 1958. Chap. 2 Friction Drag, Chap. 3 Pressure Drag, and Chap. 12 Land–Borne Vehicles.
W. A. Mair, "The Effect of a Rear–Mounted Disc on the Drag of a Blunt–Based Body of Revolution", The Aeronautical Quarterly, vol. XVI, Pt. 4, Nov. 1965, pp. 350–360.
Mason, W. T. Jr., and Beebe, P. S., "The Drag Related Flow Field Characteristics of Trucks and Buses", pp. 45–93, in the book Aerodynamic Drag Mechanisms of Bluff Bodies and Road Vehicles; Gino Sovran, Thomas Morel, and W. T. Mason, Jr., eds., Plenum Press, New York and London, 1978.

(Continued)

*Primary Examiner*—Kiran B. Patel

(57) ABSTRACT

An improved method and device for reducing the base drag of bluff bodies, including large boxy highway vehicles such as semi-trailer trucks, which uses low drag vortex generators in combination with either a trailing panel or shortened boattail plates, to provide greater base drag reduction than other previously known methods. The preferred embodiment reduces the required length of boattail plates by over half, making it compatible with current U.S. regulations for trailer underride bars, and providing easier access for rear cargo doors. The device is easily installed as an add-on device on both new and existing truck bodies. In an alternate configuration, the shape of one or more sets of shortened boattail plates can be built into the rear body shape of vehicles, to maximize the interior volume for a given total vehicle length.

8 Claims, 8 Drawing Sheets

U.S. PATENT DOCUMENTS

| | | | | | |
|---|---|---|---|---|---|
| 4,142,755 | A | * | 3/1979 | Keedy | 296/180.2 |
| 4,214,787 | A | * | 7/1980 | Chain | 296/180.4 |
| 4,257,641 | A | * | 3/1981 | Keedy | 296/180.4 |
| 4,320,920 | A | * | 3/1982 | Goudey | 296/180.4 |
| 4,360,232 | A | * | 11/1982 | Elder | 296/180.4 |
| 4,427,229 | A | * | 1/1984 | Johnson | 296/180.4 |
| 4,451,074 | A | * | 5/1984 | Scanlon | 296/180.4 |
| 4,455,045 | A | | 6/1984 | Wheeler | |
| 4,458,936 | A | * | 7/1984 | Mulholland | 296/180.4 |
| 4,508,380 | A | | 4/1985 | Sankrithi | |
| 4,601,508 | A | * | 7/1986 | Kerian | 296/180.4 |
| 4,682,808 | A | | 7/1987 | Bilanin | |
| 4,702,509 | A | * | 10/1987 | Elliott, Sr. | 296/180.4 |
| 4,741,569 | A | * | 5/1988 | Sutphen | 296/180.4 |
| 4,818,015 | A | * | 4/1989 | Scanlon | 296/180.1 |
| 4,978,162 | A | | 12/1990 | Labbe | |
| 5,058,837 | A | * | 10/1991 | Wheeler | 244/198 |
| 5,058,945 | A | | 10/1991 | Elliott, Sr. | |
| 5,236,347 | A | * | 8/1993 | Andrus | 296/180.4 |
| 5,280,990 | A | | 1/1994 | Rinard | |
| 5,289,997 | A | | 3/1994 | Harris | |
| 5,348,366 | A | * | 9/1994 | Baker et al. | 296/180.4 |
| 5,357,903 | A | * | 10/1994 | Rivera | 119/246 |
| 5,498,059 | A | * | 3/1996 | Switlik | 296/180.1 |
| 5,947,548 | A | * | 9/1999 | Carper et al. | 296/180.1 |
| 6,092,861 | A | * | 7/2000 | Whelan | 296/180.2 |
| 6,257,654 | B1 | * | 7/2001 | Boivin et al. | 296/180.4 |
| 6,286,894 | B1 | * | 9/2001 | Kingham | 296/180.1 |
| 6,309,010 | B1 | * | 10/2001 | Whitten | 296/180.1 |
| 6,409,252 | B1 | * | 6/2002 | Andrus | 296/180.1 |
| 2002/0021023 | A1 | * | 2/2002 | Leban | 296/180.1 |

OTHER PUBLICATIONS

D. J. Maull, "Mechanisms of Two and Three Dimensional Base Drag", pp. 137–159, in the book Aerodynamic Drag Mechanisms of Bluff Bodies and Road Vehicles; Gino Sovran, Thomas Morel, and W. T. Mason, Jr., eds., Plenum Press, New York and London, 1978.

Mair, W. A., "Drag Reducing Techniques for Axisymetric Bluff Bodies", pp. 161–187, in the book Aerodynamic Drag Mechanisms of Bluff Bodies and Road Vehicles; Gino Sovran, Thomas Morel, and W. T. Mason, Jr., eds., Plenum Press, New York and London, 1978.

Thomas Morel, "Aerodynamics", Chap. 10 in the book, Fuel Economy in Road Vehicles Powered by Spark Ignition Engines, George S. Springer and John C. Hilliard, eds., Plenum Press, NewYork, 1984.

W. Lanser, J. Ross, and A Kaufman, "Aerodynamic Performance of a Drag Reducing Device on a Full–Scale Tractor/Trailer", pp. 451–460, in the book Vehicle Aerodynamics, V. Sumantran and Gino Sovran, eds., SAE, 1996.

"A Historical Survey of Automotive Aerodynamics", Technical Paper by Prof. A. T. McDonald, School of Mech. Engineering, Purdue University, W. Lafayette, IN, circa 1978.

49 CFR, Part 393, USDOT regulations on trailer underride bars.

"http://www.airtab.com/" web site for Aeroserve Technologies, Nepean, Ontario, Canada, a maker of Vortex Generators suitable for use on full sized trucks. Copy printed in Aug. 2001 from the web site.

"Tractor Trailer Drag Reduction", a brief report of a student research project at Clarkson University, Potsdam, NY. Copy printed on Aug. 2001 from the web site , "http://www.clarkson.edu/~visser/research/drag/truck/index.html".

"Trailer Drag Reduction", undated report on the student research project at Clarkson Univ., Potsdam, NY. Copy printed Aug. 2001 from the pdf file "Clarkson_E–team.pdf" downloaded from the web site "http://www.clarkson.edu/~maeweb/studentPages/trailer/".

"http://www–energy.llnl.gov/aerodrag/" Web site for the Heavy Vehicle Aerodynamic Drag Project, a five year project by researchers from several government labs and universities, funded by the U.S. Dept. of Energy. Copy printed from the web site in Sep. 2001.

* cited by examiner

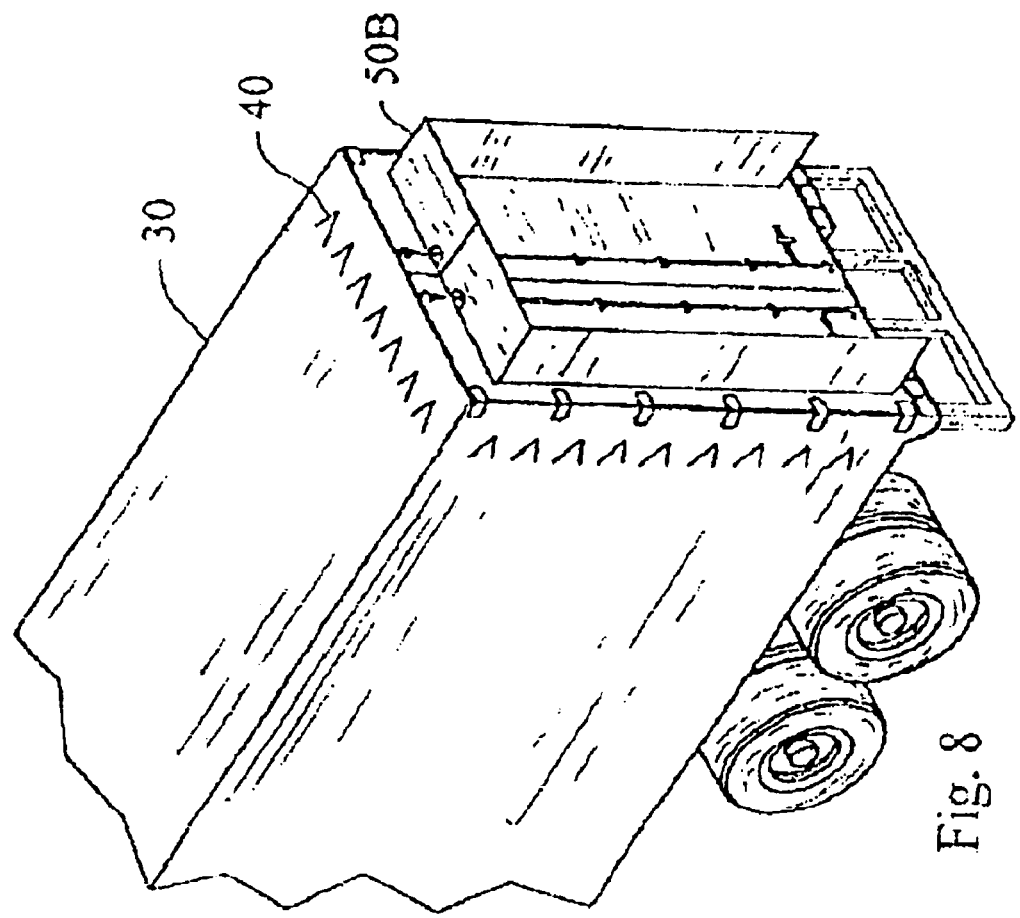
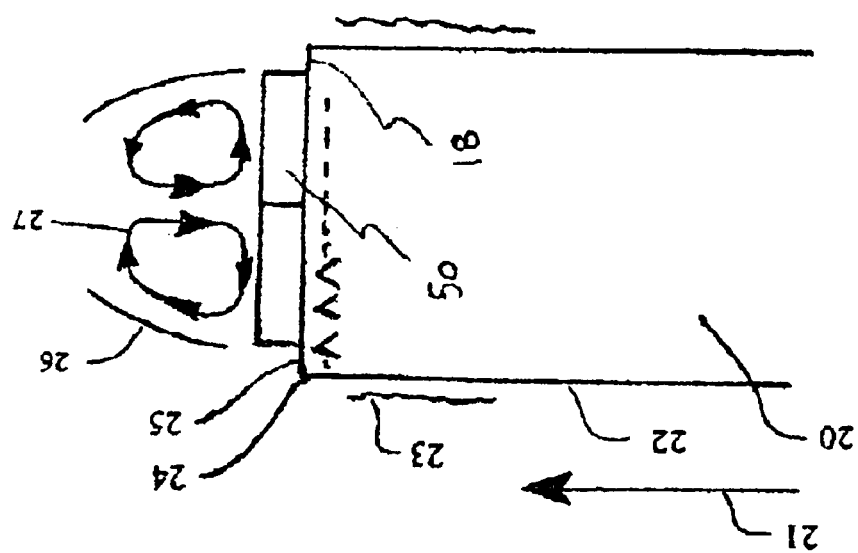
Fig. 8

AERODYNAMIC COMBINATION FOR IMPROVED BASE DRAG REDUCTION

CROSS REFERENCE TO RELATED APPLICATIONS

Applicant claims priority based on the following two provisional patent applications, both using the same title as the present application:

60/210,325 filed on Jun. 9, 2000
60/275,059 filed on Mar. 12, 2001

STATEMENT REGARDING FEDERALLY SPONSORED RESEARCH AND DEVELOPMENT

The invention described herein was developed solely by the applicant, with no financial or other assistance from the United States government.

FIELD OF THE INVENTION

The invention relates to an improved method and apparatus for reducing the fluid dynamic base drag of bluff bodies, including the aerodynamic base drag of large boxy highway vehicles such as trucks, busses, minivans and motor homes.

BACKGROUND OF THE INVENTION

The highway transportation system in North America is almost totally dependent on fossil fuels, and the quantities consumed are staggering. Long haul semi-trailer trucks alone consume about 16 billion gallons of Diesel fuel per year. In addition to the direct economic costs, the indirect costs include air and water pollution, and depletion of energy resources.

For highway vehicles cruising at typical highway speeds on level roads, aerodynamic drag accounts for the largest engine load, and typically consumes a little over twice the power consumed by rolling resistance. Any significant reduction in aerodynamic drag translates directly into reduced fuel consumption, with the percentage fuel savings typically falling in the vicinity of two thirds of the total aerodynamic drag reduction.

The need for and benefits of reducing the aerodynamic drag of highway vehicles are so obvious, so compelling, and so widely recognized, that this goal often assumes the status of a hidden assumption. It therefore logically follows that all methods, or likely combinations of methods, known to those skilled in the art of aerodynamics of highway vehicles, should already be well researched and the results well documented.

Because large trucks continue to be designed and built with maximum cargo capacity and ease of loading as their primary goals, it is important for any new aerodynamic devices to be designed and built as add-on devices which are easily installed on both new and existing truck bodies, as currently manufactured.

DESCRIPTION OF THE RELATED ART

The basic principles of fluid dynamics and fluid-dynamic drag are presented in many fluid dynamics textbooks and other sources. To this day, one of the best in the field is Sighard Hoerner's classic book, Fluid-Dynamic Drag, self published by the author in 1958. In his book, the basic principles of boundary layers and skin friction drag are presented in Chap. 2, while pressure drag, including base drag, are discussed in Chap. 3. Therefore only the most pertinent technical concepts will be summarized herein.

From an energy balance standpoint, all the energy used to overcome base drag, as a bluff body is pushed through a fluid, is used up by fluid turbulence in the large recirculation bubble behind the bluff body, sometimes also called the low pressure wake. Therefore, one way to approach base drag reduction is to look for ways to reduce the total size and turbulence of this recirculation bubble.

Another good way to approach base drag reduction is to search for ways to increase the average fluid pressure pushing against the base surface of the bluff body. This fluid pressure is conveniently described as a coefficient of pressure and has a negative value for the pressure on the base surface of a moving bluff body.

On page 3–19 of Hoerner's book, he describes how the separated shear surfaces, formed when the boundary layer passes the trailing edges of a bluff body, entrain some of the relatively stagnant fluid behind the base surface of a bluff body, carrying it away to the rear. The static pressure on the base surface is reduced as a consequence, thus causing base drag. Hoerner called this the jet pump mechanism.

FIG. 1 in the drawings is provided to help illustrate how this jet pump mechanism operates to produce base drag. FIG. 1 is a schematic plan view of the rear end of a bluff body 20, with an arrow showing the direction of fluid flow 21, the boundary layers 23 which form along the side surfaces 22, and become the separated shear surfaces 26 after passing the trailing edges 24, and the simplified flow pattern 27 in the large recirculation bubble which forms in the low pressure wake behind the base surface 25.

Although forebody drag, skin friction, and base drag are often studied separately, they are not independent of each other. For a bluff body with a fairly constant cross section and a length over twice the width or height, the flow conditions at the rear of a bluff body have little or no affect on the flow conditions and form drag at the front of the body. But the reverse is not true. Flow conditions at the forebody, and along the side surfaces strongly affect flow conditions and the resulting base drag at the rear of the body.

Insulation

If the forebody is poorly formed, and the sides relatively rough, the boundary layer at the trailing edges will be relatively slow and thick, producing a weak pumping effect, and low base drag. In effect, the thick boundary layer provides a layer of insulation between the fast moving free stream air and the relatively stagnant air in the low pressure wake behind the base surface.

On the other hand, if the forebody is well formed and the sides are smooth and uncluttered, the boundary layer at the trailing edges will be much thinner, producing a strong pumping effect, low fluid pressure against the base surface, and high base drag.

Hoerner's Law

This relationship produces the perverse result that as forebody drag and skin friction are reduced, the base drag is increased, not just as a percentage of the total remaining drag, but as the absolute value of base drag. Sighard Hoerner recognized this phenomenon and described it in his book, providing an empirical formula, in FIG. 37 on page 3–19, to describe a mathematical relationship between forebody drag, including skin friction, and base drag, for three dimensional bluff bodies.

This perverse result, which could be called Hoerner's Law, means that as the front ends of highway vehicles are improved by adding fairings or other add-on aerodynamic devices to reduce forebody drag, and the side surfaces are smoothed to reduce skin friction, the base drag often increases, not just as a percentage of the remaining total drag, but also as the absolute value of base drag, and it becomes more difficult to obtain significant drag reductions at the rear of highway vehicles.

Critical Reynolds Number

Another important concept in fluid dynamics is the critical Reynolds number, above which a laminar boundary layer along the side surfaces of a bluff body will transition to a turbulent boundary layer, usually resulting in a drop in base drag at the rear of both two and three dimensional bodies. For three dimensional bluff bodies, this critical Reynolds number is usually in the range of $2 \times 10e5$ to $8 \times 10e5$, with the higher numbers applying to bluff bodies with well formed front ends and smooth side surfaces, and moving in undisturbed air. The lower range of critical Reynolds numbers applies to bodies with poorly formed front ends that yield higher forebody drag, with fairly rough side surfaces that yield higher skin friction, and moving through already turbulent air.

A turbulent boundary layer grows faster than a laminar boundary layer, and will always be thicker than a laminar boundary layer at the same position along the sides of a bluff body. A full sized truck traveling at typical highway speeds, can be expected to have a Reynolds number well above the critical value, and a generously thick turbulent boundary layer as it approaches the trailing edges, even on a trucks with smooth sides.

Small and/or slow bluff bodies, such as cartop cargo carriers or reduced size test models, having well formed forebodies and smooth sides, often have a Reynolds number well below the critical value for natural transition, which then yields a much thinner laminar boundary layer at the trailing edges, with resulting higher base drag. In this situation, base drag can often be reduced by using a trip wire or other protrusion somewhere along the side surfaces to force transition from a laminar to a turbulent boundary layer. The added skin friction resulting from the early transition to a turbulent boundary layer is usually less than the resulting base drag reduction, thus yielding a net reduction in total fluid-dynamic drag.

The need for, and benefits of, reduced aerodynamic base drag are so obvious, so compelling, and so widely recognized, that this goal often assumes the status of a hidden assumption. It therefore logically follows that all methods, or likely combinations of methods, known to people skilled in the art of aerodynamics for highway vehicles, should already be well researched and tested, and the results well documented.

Due to the extensive body of literature on this subject, only the most pertinent and recent information that the applicant is aware of, including U.S. patents, is briefly summarized herein. Other older U.S. Patents listed as references in the patents summarized in this section, can be considered as less pertinent background information.

A variety of methods and devices have been developed to reduce the base drag of bluff bodies, especially for highway vehicles. While devices proven to reduce the forebody drag of large box shaped highway vehicles are widely available and well used, base drag at the rear of vehicles has proven to be more difficult to reduce, and none of the available devices has achieved widespread use on highway vehicles.

FIG. 2 in the drawings shows the rear end of a typical large semi-trailer truck body 30, including a side surface 22A, a top surface 34, two swinging doors 36 that cover most of the base surface, two door closer bars 38, and a typical underride bar assembly 39. This drawing is provided for reference, to help illustrate the prior art devices shown in other drawings.

Previous inventions for base drag reduction, as disclosed in prior art, can be divided into three broad categories. One category includes devices which have been shown to provide significant base drag reduction, but which require excessive added vehicle length, thus conflicting with current U.S. Dept. of Transportation regulations on length beyond trailer underride bars. This category includes full and truncated boattails, trailing panels, and boattail plates.

Full Boattails

One of the first methods used to reduce base drag was to taper the rear end of a bluff body to reduce the size of the base area, a method commonly known as boattailing. Boattailing works by reducing the base area as much as possible without inducing flow separation, which can only be achieved with very long boattails. Therefore the primary drawback of full boattails is that maximum drag reduction requires extreme length, often three to four times the width of the bluff body, making full boattails impractical for highway vehicles.

Other drawbacks include the reduction of usable space for cargo or passengers inside the vehicle, and relatively high construction costs for the long curved shapes. Therefore, full boattails terminating in a point or narrow edge are rarely used.

Truncated Boattails

Some portion of the base drag savings of full boattails can be obtained by using truncated boattails. According to what is sometimes called the Kamm Theory, the maximum base drag reduction from truncated boattails is achieved by truncating the boattail shortly ahead of the point where the fluid flow would separate from the body.

Several variations of partial boattails designed for use on full sized trucks have been patented. One recent example is U.S. Pat. No. 5,058,945 to Elliot, Sr. which describes an inflatable boat tail, referred to in the patent as a bag. The patent describes the invention in great detail, including various belts, clamps, internal supporting rods, etc. A drag reduction of about 15% of total aerodynamic drag was reported for the best configuration.

Some of the disadvantages of this approach include the complex construction and method of attachment to truck bodies, and the length of the bag, which appears to be 5 to 6 ft., when used on a typical tractor/trailer truck. Furthermore, the invention apparently requires deflating and/or removal of the bags to allow the rear doors to be opened fully, and then reinflating them again before use on the highways. This is time consuming and inconvenient, and it also suggests a relatively short service life for the apparatus due to expected wear and tear.

Another recent example is disclosed in U.S. Pat. No. 4,978,162 to Labbe, which describes a partial boattail of similar shape, but which is self inflating and has no internal supporting structure. This invention is of simpler construction and does not require manual inflation or removal for access to the doors. However, other disadvantages remain, including expected short service life due to wear and tear, especially for the air scoops which are positioned at the rear edges of the body and must be deformed each time the rear doors are opened.

Another type of partial boattail can be formed by changing the shape of the rear of a bluff body. For example, U.S. Pat. No. 4,508,380 to Sankrithi describes an apparatus that uses hinged rear sidewalls on semi-trailer vans, which can be moved inward to reduce the base area. This invention has several disadvantages. First, it can only be used while the trailer is empty or only partially loaded. Second, it would be very expensive to retrofit to existing trailers. Third, it would be difficult for one person to open or close the trailer sidewalls without assistance, either from additional people or some form of mechanical assistance. Fourth, it would be difficult to make the trailer weather tight, even when in the normal full width position.

Trailing Disc or Panel

Another method for base drag reduction is the use of trailing discs or panels, mounted behind and roughly parallel to the base surface. The base drag reduction from trailing discs used behind axisymetric bluff bodies was investigated by W. A. Mair of Cambridge University in the 1960s. The present inventor has not had an opportunity to read Mair's original reports, but according to Prof. A. T. MacDonald of Purdue Univ., in his "Historical Survey of Automotive Aerodynamics", circa 1978, Mair achieved a maximum base drag reduction of 35% using one trailing disc, and 55% using two trailing discs in tandem, on an axisymetric bluff body.

Mair also summarized his work in the article, "Drag-Reducing Techniques for Axisymmetric Bluff Bodies," in the book Aerodynamic Drag Mechanisms of Bluff Bodies and Road Vehicles, Gino Sovran, Thomas Morel, and W. T. Mason, Jr., eds., Plenum Press, 1978.

Trailing discs and trailing panels are also discussed by Thomas Morel in Chap. 10 of the book, "Fuel Economy in Highway Vehicles with Spark Ignition Engines", edited by Hilliard and Springer, Plenum Press, New York, 1984.

U.S. Pat. No. 5,348,366 to Baker, et al., discloses a drag reducing device for large semi-trailer trucks which uses a simple rectangular trailing panel. In the preferred embodiment of Baker's invention, the trailing panel is split in half vertically and mounted on cantilevered hinges to allow for access to the rear doors of semi-trailer vans. A 15 percent reduction in total drag was reported for the preferred embodiment.

FIG. 4 in the drawings shows the rear end of a typical full sized semi-trailer truck body 30, with a trailing panel assembly 42 installed at the end of cantilevered mounting arms 44, as described in U.S. Pat. No. 5,348,366 to Baker, et al. The preferred mounting distance of forty five inches for the trailing panel, as disclosed by Baker, is shown roughly to scale. The trailing panel therefore extends well beyond the maximum of twenty four inches allowed by current U.S. Dept. of Transportation regulations on trailer underride bars.

Boattail Plates

U.S. Pat. No. 4,682,808 to Bilanin discloses another method of base drag reduction for large trucks, which uses an arrangement of three or four rectangular plates mounted perpendicular to the base surface, and inset at a specified distance from the trailing edges of the base surface. When used on a typical semi-trailer rig with a coefficient of drag in the range of Cd=0.60, the preferred embodiment uses plates that extend to a length 0.40 to 0.56 times the width of the body. The side plates are inset at a distance of 0.13 times the width of the body, from the side edge of the body, while the top plate is inset at a distance of 0.15 times the height of the body, from the top edge of the body. A total drag reduction of 10.2 percent was reported for this configuration. In later magazine articles about the invention, these plates were referred to as boattail plates, and this name will be used henceforth. Furthermore, boattail plates built and used according to the preferred embodiment as disclosed by Bilanin will henceforth be called full length boattail plates.

FIG. 5 in the drawings shows a perspective view of the rear end of a typical full sized semi-trailer truck body 30, with three full length boattail plates 50 installed, as taught by Bilanin. The minimum preferred plate length of forty inches for the full length boattail plates is shown roughly to scale. The full length boattail plates therefore extend well beyond the maximum extension allowed by current U.S. Dept. of Transportation regulations on trailer underride bars.

The full length boattail plates disclosed by Bilanin were further described in a later technical paper by W. Lanser, J. Ross, & A. Kaufman, titled "Aerodynamic Performance of a Drag Reducing Device on a Full-Scale Tractor/Trailer," and published in the book, Vehicle Aerodynamics, V. Sumantran and Gino Sovran, eds., SAE, 1996, pp. 451–460. In this publication, full length boattail plates were mounted on a full sized semitrailer van body and tested in the NASA Ames full scale wind tunnel. The maximum drag reduction was achieved with shorter boattail plates with a length 0.36 times the body width and inset at only 0.06 times the body width from the trailing edges of the semi-trailer. This change in optimum dimensions is apparently due to the effects of lower forebody and skin friction drag on the test vehicle, which also included side skirts on the trailer. The report claimed a drag reduction of 9.8 percent of total drag with this configuration, although no before or after figures for total drag were reported. This result supports the conclusion that reducing forebody and skin friction drag can make it more difficult to reduce base drag.

A second broad category of methods and devices for base drag reduction includes those that require little or no extension from the base surface. One such method uses devices called guide vanes. Guide vanes work by scooping up some of the fluid in the boundary layers along the sides of a bluff body, and turning it inward behind the trailing edges to help increase fluid pressure on the base surface. U.S. Pat. No. 5,280,990 to Rinard describes one form of guide vanes for use on semi-trailers, made from a flexible and resilient material which can be compressed against the body of a vehicle to allow the rear doors to be fully opened.

Although not mentioned by Rinard, the present inventor believes that the height of guide vanes must be limited to some fraction of the boundary a layer thickness. Otherwise, if the guide vanes extend outside the boundary layer into the fast moving free stream air, the resulting high parasitic drag will offset much of the base drag reduction, thus providing little or no net drag reduction.

One obvious disadvantage of guide vanes is that they must be positioned at the trailing edges of the bluff body, where they will impede the opening of rear swinging doors on a truck, and right where they are most likely to be damaged. In addition, flexible guide vanes as disclosed by Rinard will likely be subject to rapid wear and tear as they are compressed against the truck body each time the doors are opened. Also, the guide vanes at the top and bottom edges of the base surface will still be in the way whenever a large truck with rear doors is backed up against a loading dock, and they too will likely be subject to rapid wear and tear.

Vortex Generators

Another method of base drag reduction, based on boundary layer control, uses devices called vortex generators, which create a series of long trailing vortices in the passing fluid. Typically, the vortex generators are designed and placed so that adjacent vortices in a series rotate in opposite directions, so that each trailing vortex reinforces the two adjacent vortices, rather than oppose and diminish adjacent vortices.

Vortex generators were apparently first used in aviation, where they are now commonly used to maintain attached flow on airfoils, to improve the load capacity of airplanes, increase stall angle, reduce landing speeds, etc.

Vortex Generators can also be used to reduce the base drag of bluff bodies. In simple terms, vortex generators energize the relatively slow moving fluid in boundary layers, helping it turn inward more quickly behind the rear or trailing edges of a bluff body.

Early researchers had serious doubts that vortex generators could be used to produce any net drag reduction. For example, Sighard Hoerner, on page 3–26 of his classic book, Fluid-Dynamic Drag, self published by the author in 1958, dismissed the potential value of vortex generators for drag reduction. He acknowledged that separation can be somewhat delayed and the lift of wings and flaps can be increased by using vortex generators. However he clearly stated, "With regard to drag, an equal price has to be paid, however, for avoiding separation in the form of momentum losses in the outer air stream." However, other people continued working with vortex generators, eventually developing newer and better versions and learning how to use them more effectively to provide net drag reduction.

Early versions of vortex generators included simple vane type vortex generators and then later V shaped ramp type vortex generators, which are sometimes mounted with two or three in tandem to increase their effect. U.S. Pat. No. 4,455,045 issued to Wheeler in 1984 discloses cascade type vortex generators which are expensive to manufacture and cover a relatively large surface area.

U.S. Pat. No. 5,058,837 issued to Wheeler in 1991, discloses V shaped low drag vortex generators which are both smaller and more effective than earlier designs. This patent to Wheeler teaches that these low drag vortex generators are most efficient when the thickness of the boundary layer is four to five times the height of the sidewalls of the vortex generators. Or, stated conversely, the vortex generators should be only 20 to 25 percent of the boundary layer thickness where the vortex generators are placed.

Wheeler's 1991 patent also teaches that low drag Vortex generators can be used to reduce the base drag of highway vehicles, with reported drag reduction in the range of 4 to 5 percent of total aerodynamic drag. FIG. 27 in Wheeler's 1991 patent shows a row of these low drag vortex generators mounted above the rear window of a typical sedan automobile.

FIG. 3 in the drawings shows the rear end of a typical large semi-trailer truck body 30, with a row of V shaped low drag vortex generators 40 installed on the side and top surfaces, as taught in Wheeler's 1991 patent. The vortex generators shown are not drawn to scale, for purposes of drawing clarity. The vortex generators will typically be smaller and more numerous than those shown in the drawings.

Testing by the present inventor has revealed that Wheeler's low drag vortex generators can provide greater base drag reduction on large boxy highway vehicles such as trucks, busses and motor homes, where base drag is typically a larger percentage of total aerodynamic drag.

Several researchers including Thomas Morel, have reported a critical angle for rear windows of cars at roughly 30 degrees from the horizontal, which produces a sudden peak of base drag. Testing by the present inventor indicates that using vortex generators ahead of the rear window does not eliminate this critical window angle, but appears to increase the critical angle to something in the range of 45 to 60 degrees from the horizontal. This critical angle varies depending on the radius or sharpness of the transition from the horizontal roof surface to the sloped rear window.

While rounded front edges on a bluff body can provide dramatic forebody drag reductions, rounded trailing edges generally provide little or no base drag reduction. To the contrary, several researchers have reported finding a critical radius of rounded trailing edges, which can produce a localized high suction coefficient for a short distance before attached flow separates from the curved surface, which therefore increases base drag. Testing by the present inventor suggests that using vortex generators does not eliminate this critical radius of rounded trailing edges, but instead appears to reduce it to slightly less than ⅛ the width or height, whichever is less, of the base surface of the bluff body.

Wheeler's low drag vortex generators are smaller in size, lower cost, and more easily attached than previous models of vortex generators, and are easily made in any desired size. Because they are installed on the sides of bluff bodies, just ahead of the trailing edges, they do not interfere with door opening or loading docks, and they do not conflict with current U.S. Dept. of Transportation regulations on trailer underride bars.

The present inventor has concluded that in order to consistently achieve the maximum base drag reduction from vortex generators, they are best used where the trailing edges of the bluff body are relatively sharp edged, sometimes called a clean trailing edge, and where the base surface is nearly normal to the longitudinal axis of the bluff body. Furthermore, the height of the sides of Wheeler's low drag vortex generators should be in the range of ¼ to ⅕ the local thickness of the boundary layer.

Wheeler's Low Drag Vortex Generators appear to be the best of the currently available devices for base drag reduction on large truck bodies. They are the only available devices which provide significant base drag reduction, without conflicting with current U.S. Dept. of Transportation regulations on trailer underride bars.

Structured Surfaces

Another type of apparatus for base drag reduction is disclosed in U.S. Pat. No. 5,289,997 to Harris, which describes a dimpled or otherwise structured surface installed on the base surface of bluff bodies. These dimples appear similar in concept to the dimples on golf balls, but at a much larger size. This patent to Harris provides no detailed description of the mechanism by which the invention produces drag savings, and instead assumes that it must be due to turbulence.

The primary advantage of this method of base drag reduction is that the surface structures can be of limited thickness, apparently as little as three inches when used at the rear of a full sized semi-trailer.

The primary disadvantage of the invention in the Harris patent is the complex geometric shapes, which must be expensive to produce. Also, the Harris patent does not report the base drag savings achieved, which suggests the drag savings are probably modest at best.

Active Methods

A third broad category of methods and/or devices for base drag reduction includes so-called active methods which require moving parts and/or auxiliary power sources to move them in order to provide base drag reduction. These methods include introducing low volume bleed air into the base region, slot blowing or suction at the trailing edges, and installing rotating cylinders at the trailing edges.

All of these active methods have significant disadvantages. None of them can easily be added to existing vehicles. In addition, each of these methods requires machinery that intrudes into the cargo or passenger space of the vehicle, and they require some auxiliary power source to drive the machinery, in order to provide maximum base drag savings. Therefore, these methods appear to be impractical and uneconomical for use on highway vehicles in the near future.

Combination Methods

A fourth potential category of methods to reduce base drag includes those which use two or more of the previously described methods in combination. However, there have apparently been few attempts to develop workable combinations, and the few attempts reported have apparently met with only limited success.

The previously mentioned U.S. Pat. No. 5,058,945 to Elliot, Sr., for a form of truncated boattail, mentions that vortex generators can be used "for promoting attached flow over the bag". However it does not teach or suggest that the addition of vortex generators can produce significant additional drag reduction compared to the best configurations used without vortex generators (config. 27 without vortex generators), or that adding vortex generators would allow using a significantly shorter bags.

Other U.S. patents disclose various forms of truncated boattails used in combination with vortex generators. However, this combination has not achieved widespread use.

W. A. Mair of Cambridge University considered a combination using vortex generators with boattails or truncated boattails in the 1960s, but found that they provided little or no additional drag savings, over the best boattail shapes when used alone. This may have been in part because he did not have access to the more effective vortex generators now available.

Mair was also reported to have tried using vortex generators in combination with a trailing disc to reduce the base drag of an axisymetric bluff body, but found no beneficial results. To the contrary, he reported testing such a combination in a wind tunnel and reported finding that no additional drag reduction was obtained.

Apparently Mair did not consider that the mounting distance for a trailing disc would need to changed, and that the disc would need to be moved much closer to the base surface, in order to gain the desired benefits of greater drag reduction. The test model used by Mair had very low forebody and skin friction drag, and therefore had a sharply defined separated shear surface, which therefore made the trailing disc very sensitive to mounting distance. He would have had to find just the right mounting distance to get the desired increase in base drag reduction.

The previously mentioned U.S. Pat. No. 5,348,366 to Baker, et al., which is based on a simple trailing panel, does not teach or suggest that the base drag could be further reduced, or the mounting distance of the trailing panel decreased, by the addition of vortex generators. In fact, U.S. Pat. No. 4,682,808 to Wheeler for Low Drag Vortex Generators was not listed among the references in the Baker patent.

In similar fashion, U.S. Pat. No. 4,682,808 to Bilanin does not teach or suggest that base drag could be further reduced, or the length of the boattail plates decreased, by the addition of vortex generators. Here again, Wheeler's patent for Low Drag Vortex Generators was not listed among the references.

In summary, none of the inventions disclosed in prior art provides sufficient base drag reduction, with acceptable added vehicle lengths and other costs, to achieve widespread use on highway vehicles. Therefore, there is still a clear and compelling need for an improved method and device which can provide greater base drag reduction, without requiring excessive added length or imposing other unacceptable conditions.

SUMMARY OF THE INVENTION

The present invention combines the use of vortex generators with either a trailing panel, or one or more sets of shortened boattail plates, to provide greater base drag reduction than any one of these three methods for base drag reduction when used alone, without requiring excessive added body length.

In the first embodiment of the present invention, vortex generators are used in combination with a trailing panel. This combination provides greater base drag reduction than either component method when used alone, while reducing the optimum mounting distance of the trailing panel by over sixty percent. With this combination, the optimum mounting distance for a single trailing panel is reduced to just under $1/8$ the width or height of the bluff body, whichever is less. For example, this optimum mounting distance is reduced to about twelve inches on a typical full sized 102 inch wide semi-trailer van.

In a second and preferred embodiment of the present invention, low drag vortex generators are used in combination with one or more sets of shortened boattail plates. This combination provides greater drag reduction than either component method when used alone, while reducing the optimum rearward extension of the boattail plates by over half. With this combination, the optimum rearward extension for a single set of boattail plates is reduced to roughly $1/6$ the width or height of the bluff body, whichever is less. For example, the optimum boattail length is reduced to about 17 inches on a typical full sized 102 inch wide semi-trailer van.

This second embodiment of the invention, using low drag vortex generators in combination with shortened boattail plates, is preferred over the previous combination using a trailing panel, because it is expected to provide base drag savings equal to the first embodiment, while being less sensitive to length and mounting positions of the plates. It also requires less material, offers easier mounting and construction, and is easier to use by vehicle operators. Furthermore, it is also expected to require less testing to determine the optimum lengths and mounting positions of the plates, for each type and model of vehicle that it is applied to.

In an alternate configuration of the second embodiment, two or more sets of shortened boattail plates can be used in tandem, in combination with vortex generators, to provide additional base drag savings, with each additional set of boattail plates providing successively smaller incremental drag savings. In another alternate configuration, the shape of one or more sets of shortened boattail plates can be built into the rear body shape of the bluff body, to maximize usable interior volume within a given total body length.

OBJECTS AND ADVANTAGES OF THE INVENTION

Accordingly, the primary objects and advantages of the present invention are:

(a) to provide a simple method and device that delivers greater base drag reduction for large boxy highway vehicles and other bluff bodies, than any previously known methods and devices for base drag reduction.

(b) to provide this greater base drag reduction without requiring excessive added vehicle length, or conflicting with current U.S. regulations for trailer underride bars.

(c) to provide this greater base drag reduction with a simple device that is more easily folded or otherwise retracted or removed than previously available devices, to allow unimpeded access to rear cargo doors, making it more likely to be widely used.

(d) to provide this greater base drag reduction with a simple device that is easily installed on existing semi-trailer vans and other trucks.

(e) to provide this greater base drag reduction with a simple device that requires no moving parts or auxiliary power source to provide base drag reduction, and does not intrude into the interior cargo space.

Furthermore, by extension, the present invention fulfills to a greater degree than any previously known methods and devices for base drag reduction, all the specific objects of these previously known methods and devices for base drag reduction, including:

1. to reduce the base drag of bluff bodies, including large boxy highway vehicles, thereby reducing fuel consumption, operating costs, and air pollution.
2. to reduce the engine power required to move highway vehicles, and thus reduce engine noise and wear, and increase engine service life.
3. to improve the stability and handling of large boxy highway vehicles, making them less tiring to operate.
4. to reduce the partial vacuum behind highway vehicles, thus reducing the lifting of tire spray during wet driving conditions, improving visibility for following drivers, and reducing unsightly dirt deposits on the rear surfaces of vehicles.

Further objects and advantages of the present invention will become apparent from consideration of the drawings and ensuing detailed description.

BRIEF DESCRIPTION OF THE DRAWINGS

FIG. 8 is a perspective view of a truck body, showing the combined use of low drag vortex generators and a single set of three shortened boattail plates, according to the second embodiment of the present invention.

DETAILED DESCRIPTION OF THE INVENTION

The invention will be described in terms of reducing the aerodynamic base drag of large boxy highway vehicles, since this is expected to be the most common application for the invention. However the invention can also be used to reduce the base drag of other types of bluff bodies, including those that operate in liquids.

The invention combines the use of vortex generators with either a trailing panel, or with one or more sets of shortened boattail plates, to provide greater base drag reduction than any of these three methods and devices when used alone.

First Embodiment

In the first embodiment of the invention, vortex generators are used in combination with a trailing panel, to provide greater base drag reduction than either method when used alone, while reducing the required mounting distance for the trailing panel by over two thirds.

When used in this combination, the vortex generators are mounted and used in the same manner as when they are used alone, without a trailing panel. The size and mounting distance for the trailing panel can be expressed as non-dimensional ratios, based on the width or height of the base surface, whichever is less, and the trailing panel is centered on the base surface. For a bluff body where width is less then height, the preferred width of the trailing panel is roughly ¾ of the width of the bluff body, leaving a border of ⅛ the width of the bluff body. The same border width of ⅛ the width of the bluff body, can then be used at the top and bottom edges of the trailing panel. For typical applications, the mounting distance for the trailing panel is just under ⅛ of the width or height of the bluff body, whichever is less. For all applications, the size and mounting distance of the trailing panel must be adjusted so the edges of the trailing panel intercept the separated shear surfaces behind the trailing edges of the bluff body.

For application on a typical full sized 102 inch wide semi-trailer truck body, the trailing panel width will be roughly 76.5 inches, and the required mounting distance will be reduced to roughly 12 inches, which is less than one third of the preferred mounting distance as disclosed by Baker.

Figure 7:
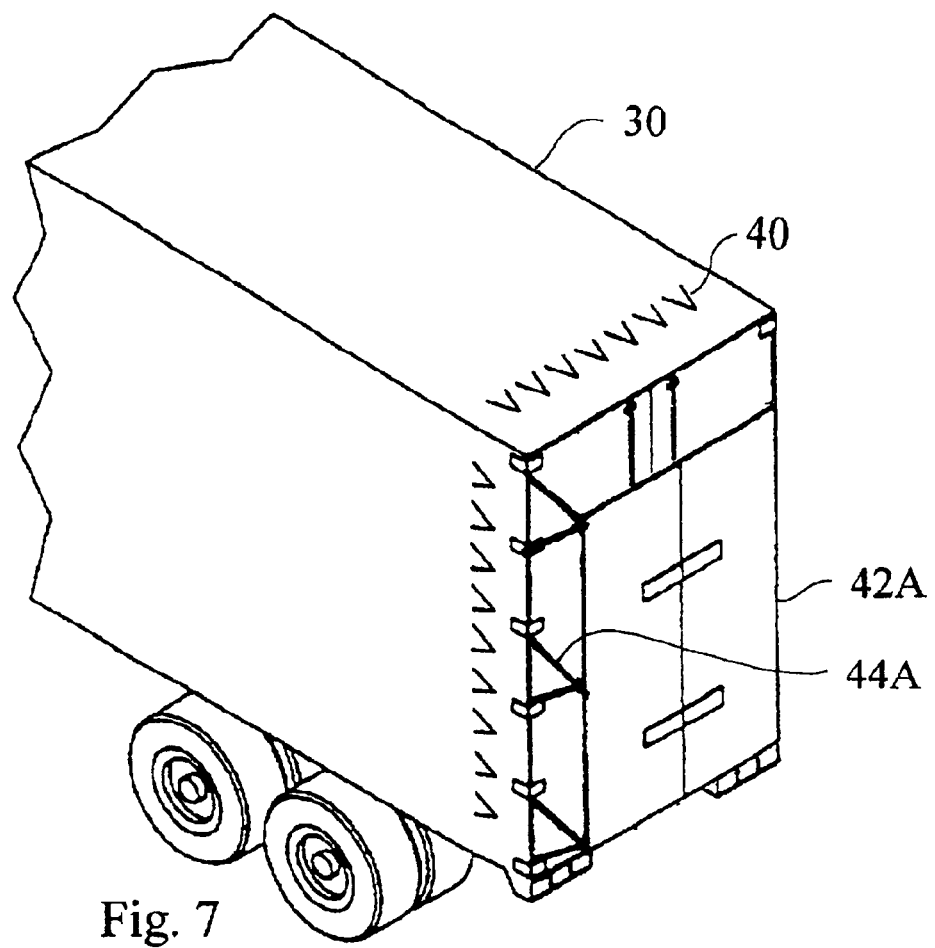
FIG. 7 is a perspective view of the rear end of a truck body, showing the combined use of low drag vortex generators and a trailing panel, according to the first embodiment of the present invention.

This first embodiment of the present invention is shown in FIG. 7, which shows a perspective view of the rear end of a typical full sized semi-trailer truck body 30, with low drag vortex generators 40 and a trailing panel 42A installed on mounting arms 44A according to the present invention. The greatly reduced mounting distance of the trailing panel is shown roughly to scale, at 12 inches. The trailing panel therefore falls within the maximum extension allowed by current U.S. Dept. of Transportation regulations on trailer underride bars.

For this combination, the optimum mounting distance for a single trailing panel is reduced to roughly ⅛ or 12.5 percent of the width or height of the bluff body, whichever is less. This preferred mounting distance is far less than the 45 percent of body width as taught by Baker. The exact mounting distance for the trailing panel is expected to vary slightly depending on the local boundary layer thickness, the effectiveness of the vortex generators used, and perhaps other less important variables.

Testing of this first embodiment by the present inventor on a reduced size test model with less than optimum forebody shape yielded a total drag reduction in the vicinity of 35 percent. However, the resulting base drag reduction was sensitive to the mounting distance of the trailing panel. After the forebody shape was improved, small changes in mounting distance, as little as one percent of the body width, caused significant changes in the resulting base drag reduction. Because of this sensitivity, the mounting distance should be optimized by testing on each bluff body to which this first embodiment of the invention is applied.

During later testing, after the forebody shape was optimized, the mounting distance for the trailing panel was found to be even more sensitive, and it became difficult to achieve any consistent drag reduction. This result suggests that this first embodiment of the present invention is not well suited for use on bluff bodies with very low forebody drag. For bluff bodies with very low forebody drag, other methods of base drag reduction, including the second embodiment of the present invention, should be considered.

Although the drag reduction performance of this first embodiment of the invention is sensitive to mounting distance, this mounting distance can be varied within a small range of perhaps plus or minus ten percent of the preferred mounting distance, with only a small decrease in base drag reduction, as long as the size of the trailing panel is also adjusted to insure that the edges of the trailing panel still intercept the separated shear surfaces. In other words, the trailing panel can be moved up to ten percent closer to the base surface, as long as the trailing panel size is increased to compensate, so that the edges of the panel still precisely intercept the separated shear surfaces. Conversely, the trailing panel can be mounted up to ten percent farther from the base surface, as long as the panel size is decreased to compensate, so that the edges of the panel still precisely intercept the separated shear surfaces.

For typical large trucks, with relatively high forebody drag and rough sides that yield high skin friction drag, and thick boundary layers at the trailing edges, a trailing panel can be expected to have only modest sensitivity to mounting distance. In this situation, this first embodiment of the invention, using vortex generators in combination with a trailing panel, can be used to provide greater base drag reduction than was previously available.

If rising fuel prices continue driving a trend to improved forebody shapes and smooth side surfaces that yield thin boundary layers at the trailing edges, trailing panels will become more sensitive to mounting distance, and it may become impractical to use this combination of vortex generators and a trailing panel on future large trucks.

Many recent models of smaller highway vehicles such as minivans, already have well formed forebody shapes and smooth side surfaces, with resulting thin boundary layers at their trailing edges. For these vehicles, it may already be impractical to use this combination of vortex generators and a trailing panel for base drag reduction.

Second Embodiment

In a second and preferred embodiment of the present invention, vortex generators are used in combination with boattail plates, to provide greater base drag reduction than either method when used alone, while reducing the optimum length of the boattail plates by over half. This second embodiment of the present invention is expected to work well behind all bluff bodies having a substantially flat base surface, substantially normal to the direction of travel. Reduced length boattail plates, built and used in accordance with this second embodiment of the present invention, will henceforth be called shortened boattail plates.

This second embodiment of the present invention, using vortex generators and shortened boattail plates, provides base drag savings roughly equal to the first embodiment using trailing panels, while being far less sensitive to plate length and mounting positions. Also, this combination of vortex generators and shortened boattail plates is less sensitive to variations in the boundary layer thickness due to differences in forebody drag, skin friction, accessory drag, etc., thereby requiring less testing to determine the optimum plate lengths and mounting positions for each type and model of vehicle that the invention is applied to.

Furthermore, this combination has no critical boattail plate lengths, where base drag is increased instead of decreased, and therefore can be expected to provide significant base drag reduction in all driving conditions, with no adverse effects due to changes in barometric pressure due to changing weather conditions or elevations. Small deviations from the optimum plate lengths and/or mounting positions will typically cause only small reductions in the resulting base drag reduction. These and other advantages make this the preferred embodiment of the invention. Therefore, all further description of the invention will refer to this second and preferred embodiment of the invention, using shortened boattail plates, unless otherwise noted.

The preferred dimensions and positioning of the shortened boattail plates, for maximum base drag reduction, can be expressed as non-dimensional ratios, based on the width or height of the base surface, whichever is less. According to the present invention, the optimum length of a single set of shortened boattail plates is reduced to roughly 18 percent of the width or height of the bluff body. This reduced boattail length is less than half of the 40 to 60 percent of body width preferred for full length boattail plates used without vortex generators, as taught by Bilanin.

For maximum base drag reduction, the shortened boattail plates are inset from the side edges of the bluff body at a distance of 8 to 9 percent of the width or height of the bluff body, whichever is less. The same inset distance can be used for both the side and top plates. The combination of plate length and inset distance must always result in the rear edges of the shortened boattail plates intercepting the separated shear surfaces. Therefore, for a full sized semi-trailer van of 102 inches total width, the shortened boattail plates will extend about 18 inches, and will be mounted at roughly 8 inches inset from the side and top edges of the truck body. In this configuration, the invention is expected to provide up to 50 percent greater base drag reduction than either vortex generators or full length boattail plates when used alone.

For typical highway vehicles, the length and inset distance for a bottom boattail plate is less critical. In fact, the fourth or bottom plate can often be omitted, with little or no loss of base drag reduction, on highway vehicles having high underbody drag which results in a thick and slow moving underbody boundary layer that often extends all the way to the road surface. This includes most large trucks, and many other highway vehicles with low ground clearance.

Typical large truck bodies with a simple rectangular base surface, having two vertical side edges, a horizontal top edge and a horizontal bottom edge, offer the simplest application for this second embodiment of the present invention. For these applications, the shortened boattail plates will also be simple flat rectangular shapes.

However, the invention can also be used on bluff bodies with other less regular base surfaces, or with oval or round base surfaces. For these applications, the cross sectional shape of the rear edges of the boattail plates must match the shape of the base surface, but at a smaller size, so that the rear edges of the plates are inset at the proper distance, and have the same required length, and thus maintain the same position, relative to the trailing edges of the bluff body and the direction of travel.

FIG. 8 shows a perspective view of the rear end of a typical full sized semi-trailer truck body 30, with low drag vortex generators 40, and a single set of three boattail plates 50B installed according to the present invention. The greatly reduced length of 18 inches for the shortened boattail plates is shown roughly to scale. The shortened boattail plates therefore fall well within the maximum extension allowed by current U.S. Dept. of Transportation regulations on trailer underride bars, for trailers built before Jan. 28, 1998.

The present invention is also expected to yield cost effective drag reduction, when less than optimum plate lengths or mounting positions must be used in order to avoid existing structural members, or for other reasons. When less than optimum plates lengths are used, the plates must be mounted closer to the edges of the bluff body, so the rear edges of the plates still intercept the separated shear surfaces.

For each application, a suitable ratio of plate length to mounting position must be used to allow the rear edges of the boattail plates to intercept the separated shear surfaces. The ratio of inset distance to plate length will generally be in the range of 0.33 to 0.44. Using a single linear ratio is not practical due to the curved shape of the separated shear surfaces. Also, the curvature of the separated shear surfaces may vary from one bluff body to another depending on the forebody and skin friction drag, and thus the thickness of the boundary layers.

Figure 9:
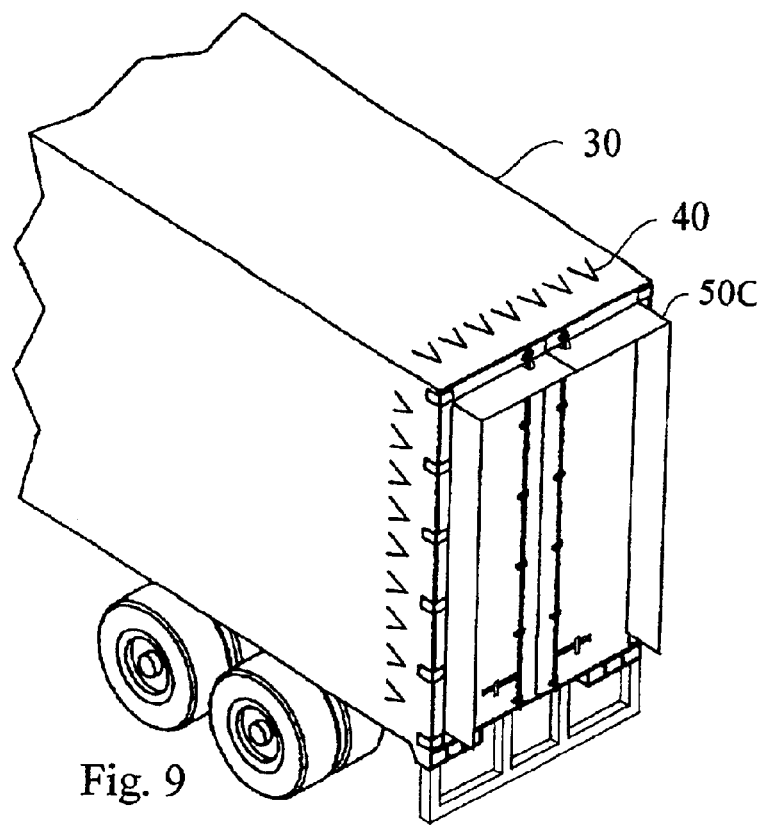
FIG. 9 is a perspective view of a full sized semi-trailer truck body, showing the second embodiment of the present invention, with the shortened boattail plates now limited to 12 inches extension.

FIG. 9, shows a perspective view of the rear end of a typical full sized semi-trailer truck body 30, with vortex generators 40 and a set of three 12 inch long boattail plates 50C drawn roughly to scale, according to the present invention. This reduced length of 12 inches can be used to comply with the maximum extension allowed by current U.S. Dept. of Transportation regulations on trailer underride bars, for trailers built after Jan. 28, 1998. When twelve inch long boattail plates are used on a full sized semi-trailer truck body, the plates should be mounted at about 4 to 5 percent of the body width from the edges of the base surface, or roughly 4 to 5 inches. In this configuration, the invention is expected to provide 20 to 30 percent greater base drag reduction than either vortex generators or full length boattail plates when used alone.

For applications where a highway vehicle has high underbody drag and a thick underbody boundary layer, such as a typical semi-trailer truck, the fourth or bottom boattail plate may conveniently be omitted from the rearmost set of plates, with little or no loss of base drag reduction.

The base drag reduction performance will depend primarily on the size and type of vortex generators used, and the length and positioning of the shortened boattail plates, with little or no dependence on the specific materials or construction methods used for the plates. Any thin flat material that is sufficiently rigid, durable and weather resistant, is expected to work well. The shortened boattail plates could also be made by mounting flexible materials such as canvas or other fabrics on a rigid framework, in place of rigid plates. One or more of the plates could also be made by stretching a fabric taut between other rigid elements.

The invention can utilize any conceivable method of mounting the plates, using hinges or other convenient means to allow folding, retracting or otherwise removing the plates when access is required for rear doors, with little or no loss of base drag savings. The shortened boattail plates can be mounted on hinges for folding the plates flat against the swinging doors. Latches can be provided for holding the plates in their open and functional position, and a second set of latches can be used for holding the plates in their folded or retracted position.

Figure 10:
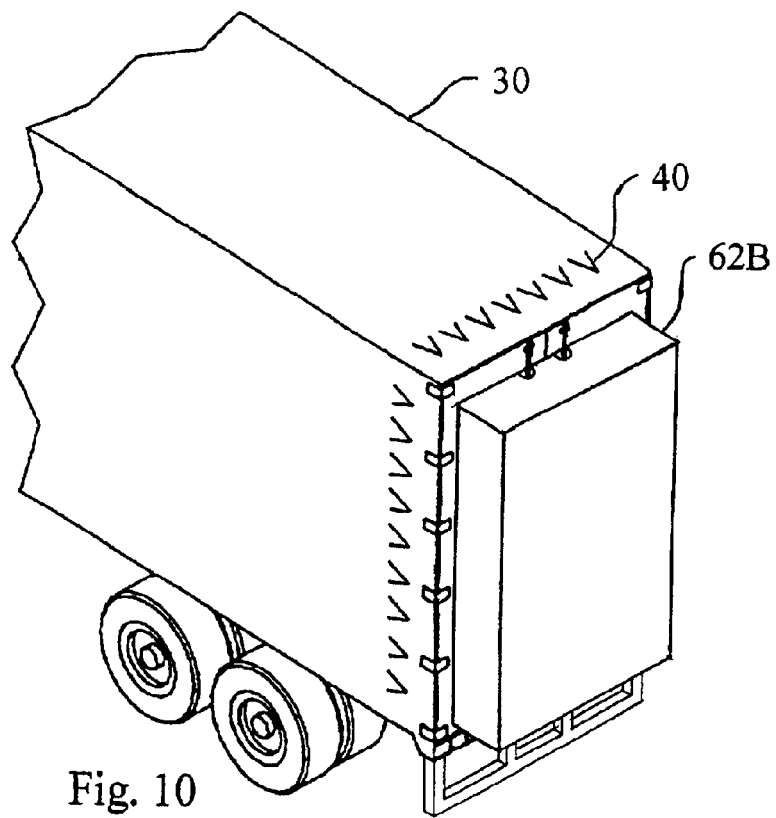
FIG. 10 is a perspective view of a truck body, showing the second embodiment of the present invention, with the shortened boattail plates now enclosed to form a box shape.

A single set of shortened boattail plates can also be enclosed to form a box shape, with little or no loss of base drag reduction. FIG. 10 shows a perspective view of the rear end of a typical full sized semi-trailer truck body 30, with low drag vortex generators 40, and a single set of shortened boattail plates enclosed to form a box shape 62B. In another alternate configuration, a separate box or storage container can be built in the required size and shape of a single set of shortened boattail plates, and attached to the base surface of a vehicle by straps or other suitable means, to function as shortened boattail plates.

When full length boattail plates are used alone on a full sized semitrailer, as disclosed by Bilanin, the greater length of the plates at 40 or more inches, combined with the mounting position about 12 inches from the edges of the trailer, results in a total length of 52 or more inches, when the plates are folded flat against the rear swinging doors of typical full sized semi-trailer vans. At this combined length, the ends of each of the vertical plates will typically overlap the split between two swinging doors, the plates will overlap each other, and will overlap the door closer bars, making full length boattail plates awkward and inconvenient to use when frequent access is required to the rear trailer doors.

In contrast, a single set of shortened boattail plates used according to the present invention will preferably be about 18 inches long, and mounted about 8 inches from the sides of the truck body, for a combined length of only 26 inches. Thus the shortened boattail plates do not overlap each other, or the two door closer bars, when folded flat against the doors. This second embodiment of the present invention will therefore be much easier for vehicle operators to use.

For vehicles that require frequent access to rear doors, it may be economically justified to provide some form of powered mechanism to retract the plates when access is needed to rear cargo doors, and then to restore the plates to their operational position.

Two or more sets of shortened boattail plates can be used in tandem, in combination with low drag vortex generators, to provide additional base drag savings, for applications where the extra cost and complexity can be justified by the additional drag savings. Each additional set of boattail plates provides successively smaller incremental drag savings, and a configuration using two sets of shortened boattail plates in tandem is expected to provide greater drag savings than a single set of plates of the same total length. Each set of shortened boattail plates used in tandem must be sized and positioned so that the rear edges of the plates intercept the separated shear surfaces which bound the low pressure wake.

To provide one example, for a full sized semi-trailer vans, the first set of plates can be twelve inches long, as allowed in the United States for trailers built after Jan. 28, 1998, and inset at roughly four inches. A second set of plates extending another six to eight inches can be used on trailers built before Jan. 28, 1998, and inset another four inches, to provide additional drag savings. The total added length of 18 to 20 inches still falls well within the two foot limit imposed by current rules for trailer underride bars. The resulting configuration with two sets of plates in tandem is expected to provide greater drag savings than a single set of plates of the same total length.

Figure 11:
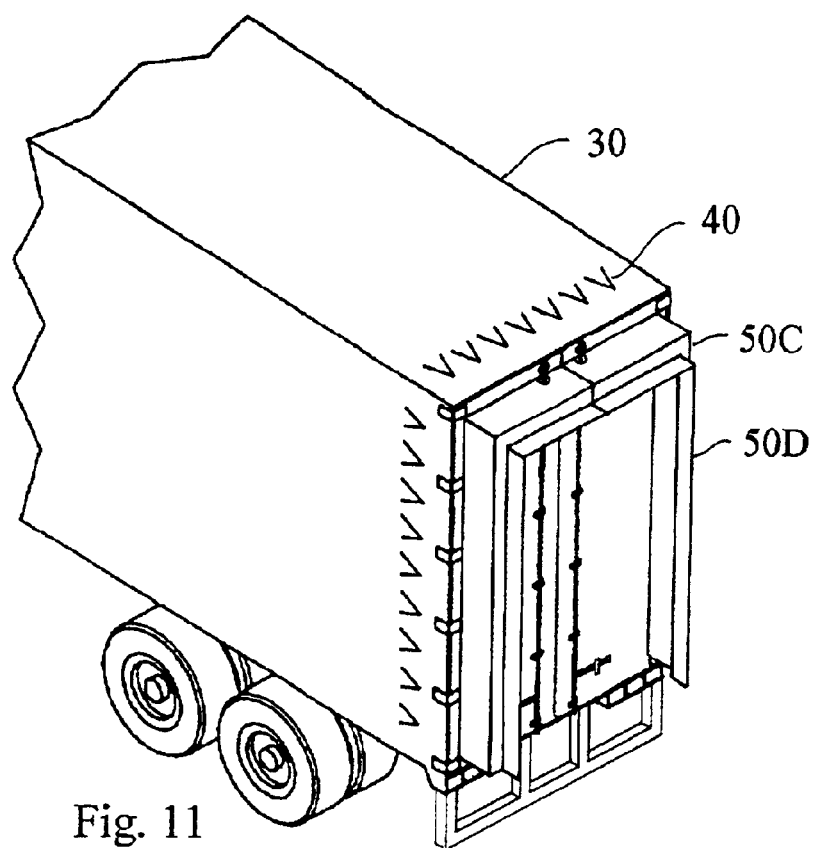
FIG. 11 is a perspective view of a truck body, showing the second embodiment of the present invention, employing two sets of shortened boattail plates mounted in tandem.

FIG. 11 shows a perspective view of the rear end of a typical full sized semi-trailer truck body 30, with low drag vortex generators 40, a first set of three 12 inch long boattail plates 50C, and a second set of three 6 inch long boattail plates 50D, mounted in tandem. Although configurations with additional sets of boattail plates will add to the complexity and cost of the apparatus, especially if they must be made to fold to allow access to rear doors, these configurations may soon be justified for high mileage vehicles, if fuel prices continue to rise.

For applications using two or more sets of boattail plates, the first or forward set of plates can be fully enclosed to form a box shape, and the second set of plates mounted on the rear surface of the box, with little or no loss of base drag savings.

Figure 12:
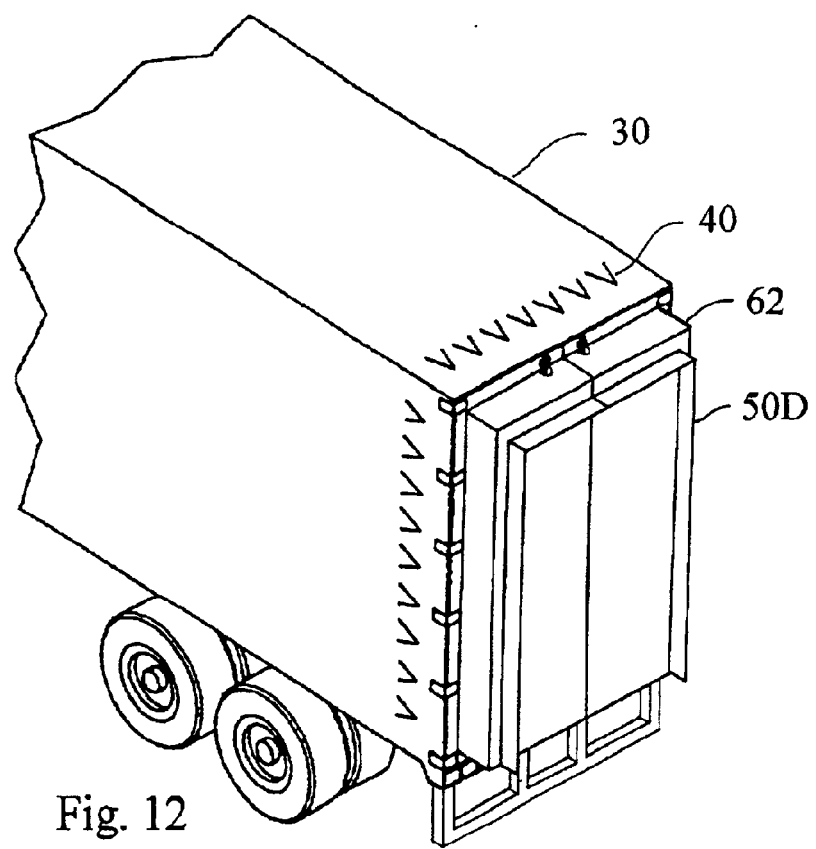
FIG. 12 is a perspective view of a truck body, showing the second embodiment of the present invention, employing two sets of shortened boattail plates mounted in tandem, with the first set of boattail plates now enclosed to form a box shape.

FIG. 12 shows a perspective view of the rear end of a typical large semi-trailer truck body 30, with low drag vortex generators 40, a first set of three 12 inch long boattail plates enclosed to form a box shape 62, and a second set of three 6 inch long boattail plates 50D, mounted in tandem on the surface face of the box.

For applications where access is not needed for rear doors, or full width doors are not needed, such as many models of intercity busses and motor homes, the shape of one or more sets of shortened boattail plates can be built into the rear body shape of the vehicle, thus increasing the usable interior space for a given vehicle length, with little or no loss of base drag reduction.

Figure 13:
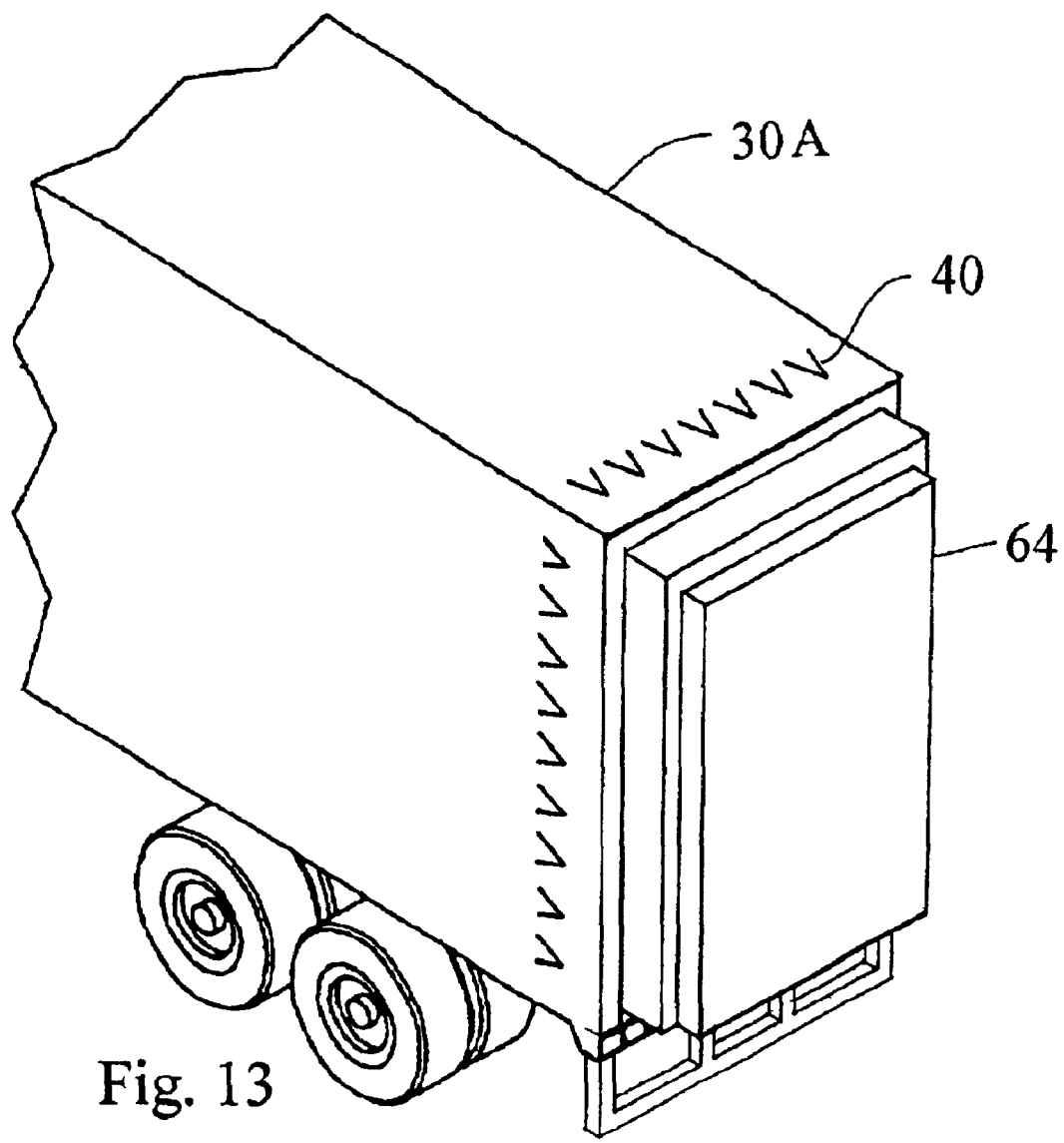
FIG. 13 is a perspective view of a truck body with no rear cargo doors, showing the second embodiment of the present invention, with the shape of two sets of shortened boattail plates mounted in tandem, built into the rear body shape of the truck.

FIG. 13 shows a perspective view of a full sized semi-trailer truck body with no rear doors 30A, with the shape 64 of two sets of shortened boattail plates built into the rear body shape of the trailer. This configuration could also be used on many other types of vehicles, including busses, minivans and motor homes.

This second embodiment of the invention can also be used on vehicles with rollup rear doors, by extending the ends of either the horizontal or vertical plates to bridge the door frame opening. Although this boattail plate assembly may sometimes decrease the usable size of the door opening, when in its functional position, this reduction may be acceptable for many users. As an alternate configuration, the shortened boattail plates can be mounted using hinges on the ends of pivot arms of predetermined length, so the vertical plates can be folded against the sides of the truck body. As another alternate configuration, the plates can be mounted so the plate assembly can be easily removed. Easy removal can be aided by using lightweight materials for the plates, or by designing the assembly to be removed in sections.

Vortex Generators

In each embodiment of the invention, it is preferred to use the best currently available vortex generators, such as the V shaped low drag vortex generators described in U.S. Pat. No. 5,058,837 to Wheeler, in order to allow the minimum length for the shortened boattail plates, without reducing the base drag reduction achieved. These low drag vortex generators are smaller and more efficient than earlier types of vortex generators, and they are much smaller than comparable guide vanes. They can be installed directly on the sides of the truck bodies, ahead of the trailing edges, where they do not obstruct rear door openings, or interfere with loading docks.

Wheeler's low drag vortex generators can be made in any size needed to match the boundary layer thickness on specific vehicles. They will preferably be manufactured of a plastic material instead of metal, making them less likely to injure wayward pedestrians or cyclists, since they need only be rigid enough to maintain their shape in the face of oncoming fluid flow in a turbulent boundary layer.

Figure 1:
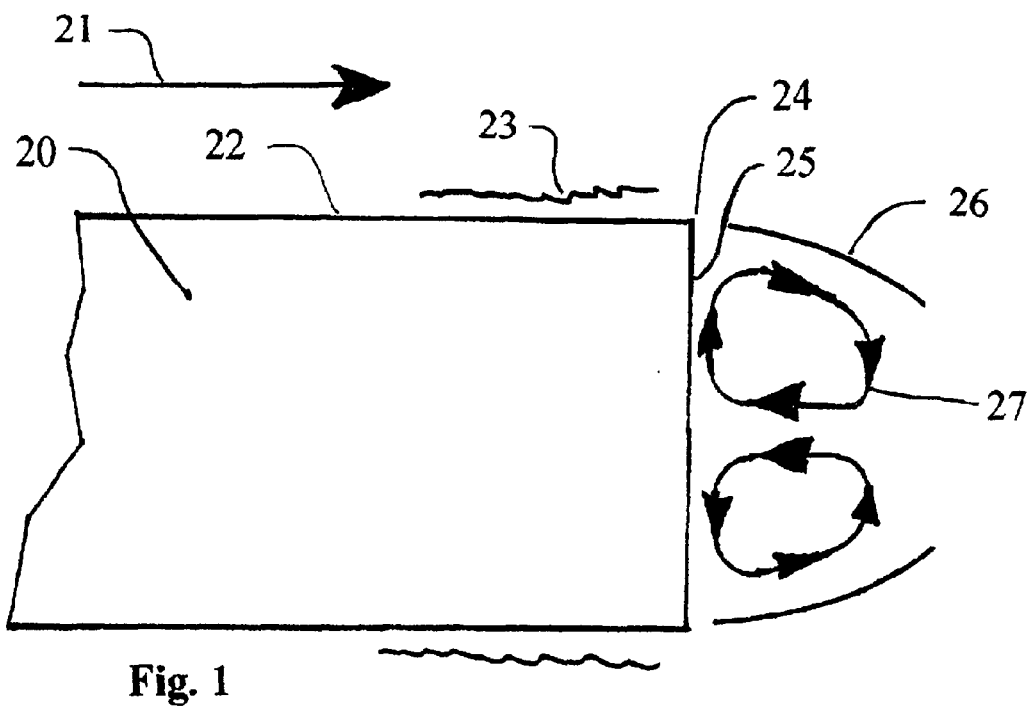
FIG. 1 is a schematic plan view of the rear end of a bluff body, showing how the jet pump mechanism described by Hoerner causes base drag behind bluff bodies.
Figure 2:
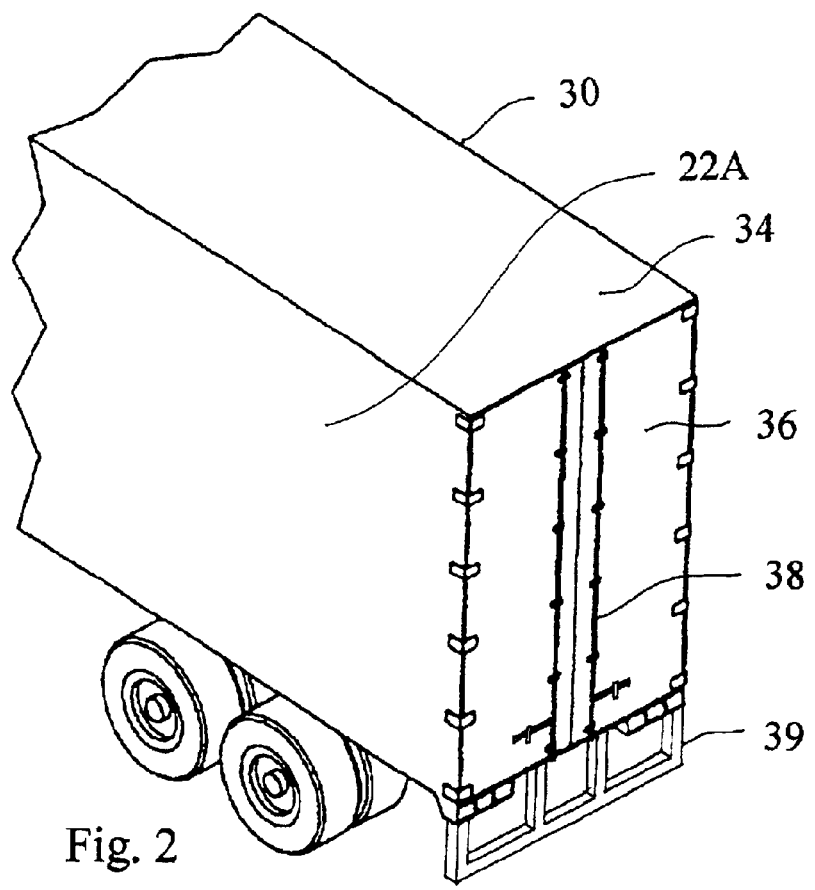
FIG. 2, provided for reference only, is a perspective view of the rear end of a typical semi-trailer truck body, with two swinging doors that meet in the middle, the attached door closer bars, and a typical trailer underride bar assembly.
Figure 3:
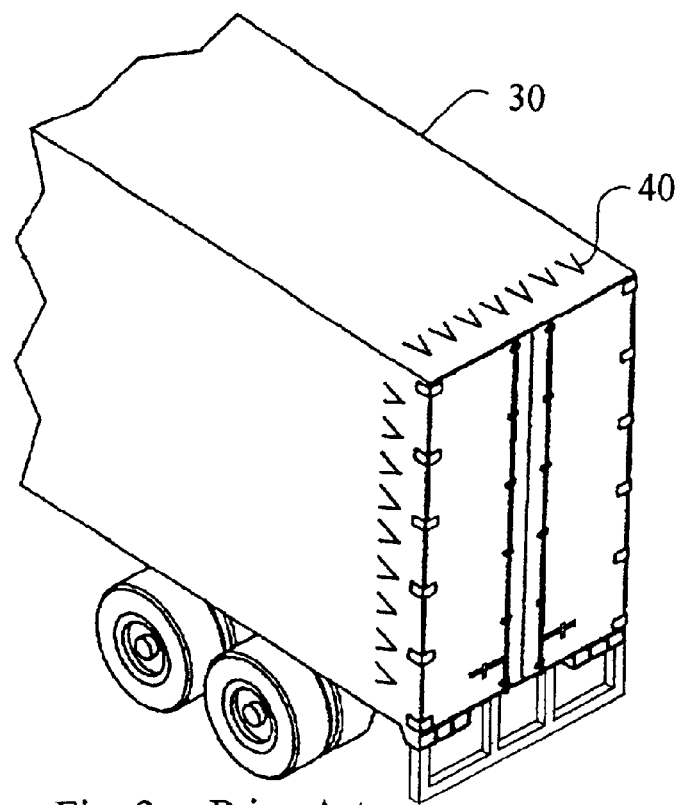
FIG. 3 is a perspective view of a typical semi-trailer truck body, with a row of V shaped vortex generators installed on the sides and roof, as disclosed in prior art.
Figure 4:
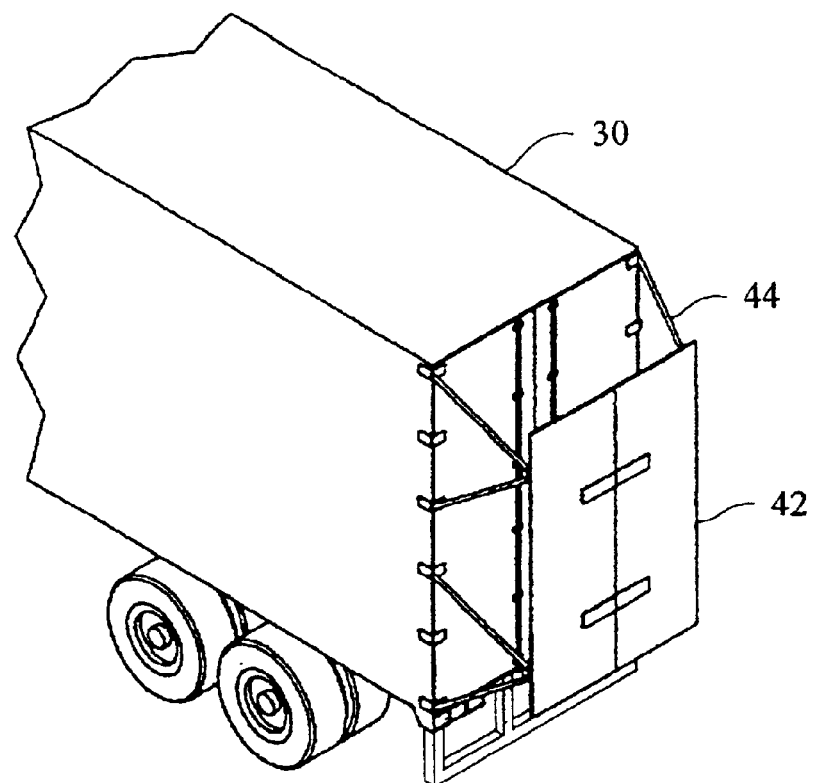
FIG. 4 is a perspective view of a truck body, showing the use of a trailing panel, as disclosed in prior art.
Figure 5:
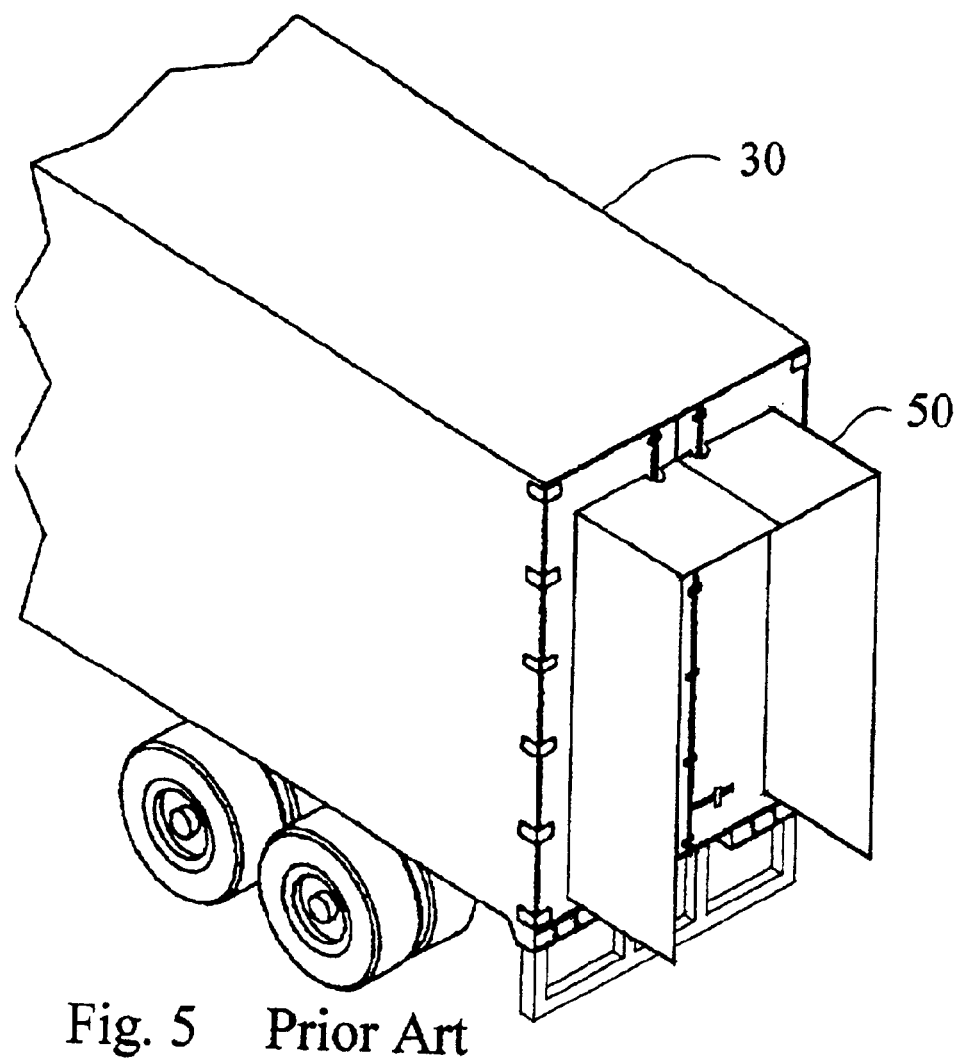
FIG. 5 is a perspective view of a truck body, showing the use of full length boattail plates, as disclosed in prior art.

The Wheeler patent discloses a wide variety of V shaped low drag vortex generator designs for use with various flow conditions. For use on highway vehicles which operate in air at low subsonic speeds, vortex generators with generally wishbone shaped planforms, such as numbers 76 and 110 in FIG. 5 of the Wheeler patent, are expected to have relatively low parasitic drag and therefore provide the greatest net drag reduction.

Testing by the present inventor has revealed that Wheeler's low drag vortex generators should preferably be mounted ahead of the trailing edges of the bluff body, at a distance of six to ten times the height of the vortex generators, in order to allow sufficient distance for the counter rotating trailing vortices to fully develop. This finding is also confirmed by AeroServe Technologies, Ltd., a maker of vortex generators in Ontario.

Ideally, the height of the low drag vortex generators will be twenty to twenty five percent of the local boundary layer thickness. Their height must in all cases be less than the boundary layer thickness, in order to avoid excessive parasitic drag, and reduced net drag reduction. Different sizes of vortex generators may sometimes be needed on the sides and roof of a highway vehicle, depending on the local boundary layer thickness. For example, the boundary layer along the roof of a semi-trailer with a smooth roof may be thinner than the boundary layer on the side surfaces, which may be rougher or have more protrusions.

If less efficient vortex generators, such as simple vane type vortex generators, are used, slightly longer boattail plates may be needed, and slightly less base drag reduction can be expected. Conversely, if more efficient vortex generators become available in the future, slightly greater drag reduction can be expected, while using slightly shorter boattail plates, mounted slightly closer to the edges of the bluff body.

Low drag vortex generators can usually be properly matched to the boundary layer thickness by simply using the appropriately sized vortex generators. However, with relatively small, short, and/or slow moving bluff bodies with low Reynolds numbers, and having well formed forebodies and smooth sides, the boundary layer will be very thin in relation to the cross sectional area of the bluff body. This thin boundary layer may have insufficient mass to provide much base drag reduction. This problem is related to the perversity described as Hoerner's Law in the background section, where low forebody and skin friction drag can often result in high base drag.

For small bluff bodies with high critical Reynold's numbers, small surface protrusions, such as a trip wire mounted crosswise to the fluid flow, can be used to trip the laminar boundary layer, thus providing a thicker and slower turbulent boundary layer for the vortex generators to act upon, and thus reducing base drag. The increased skin drag from the turbulent boundary layer will be small compared to the increased base drag reduction, thus yielding greater net drag reduction.

Tripping a laminar boundary layer to provide a thicker boundary layer at the trailing edges, will typically not be needed for full sized highway vehicles such as trucks, busses and motor homes, due to their higher Reynolds numbers. Their greater size, speed and length will normally result in natural transition to a generously thick turbulent boundary layer.

The present invention is most easily used on vehicles with a substantially flat base surface, which is substantially normal to the centerline of the vehicle, and with clean trailing edges. The Chevrolet Astro and Ford Aerostar minivans, and several recent models of Volvo station wagons offer good examples of smaller vehicles that meet these conditions.

However, the invention can also provide good base drag savings on vehicles with all or part of the base surface angled up to 30 degrees from the normal. For example, several models of minivans and station wagon automobiles have the bottom portion of their base surface nearly normal to the direction of travel, while the windows which form the upper portion of the base surface are angled forward at up to 30 degrees from the vertical. The invention can still be used under these conditions, with little loss of base drag reduction, by constructing the rear edges of the shortened boattail plates in the same shape as the base surface, but at a reduced size, so that the rear edges of the shortened boattail plates maintain the same required length and position from the trailing edges of the bluff body, relative to the direction of travel.

For vehicles with rounded trailing edges, the separation point for the passing fluid can be fixed by installing a trip wire or other suitable linear protrusion near the leading end of the rounded surface. By fixing the separation point, it then becomes possible to accurately determine the optimum position for the rear edges of the boattail plates, and thus obtain maximum base drag reduction.

In order to obtain the maximum base drag savings from the present invention, no significant gaps or openings should be allowed between the base surface and the boattail plates, or between adjacent sections of the boattail plates.

For highway vehicles with a rough or uneven base surface, that does not allow a good seal between the plates and the base surface, a large flat plate substantially normal to the centerline of the vehicle can be used to enclose the space between the leading ends of the boattail plates, providing a substitute base surface. The boattail plate assembly thus formed can be mounted on the rear of a vehicle by straps or other suitable means for temporary use. Such a removable boattail plate assembly can be used to provide drag reduction and fuel savings on occasional long highway trips, and then removed for local driving at lower road speeds.

While the present invention has been described primarily in terms of highway vehicles, it is easily seen that it can also be used to reduce base drag on other land vehicles such as railway vehicles, or on the superstructures of fast watercraft.

OPERATION OF THE INVENTION

Both embodiments of the present invention provide the desired base drag reduction without requiring any moving parts. In other words, both embodiments of the invention can be considered as passive drag reduction devices.

Although the trailing panel used in the first embodiment and the shortened boattail plates used in the second embodiment are preferably mounted on hinges, these hinges are not required for base drag reduction. They are needed only to allow the trailing panel or boattail plates to be folded or retracted when the vehicle is not moving, to allow unimpeded access to cargo doors. Roughly the same net drag reduction is available, whether the trailing panel or shortened boattail plates are permanently mounted, or mounted on hinges, or are completely removed when not in use.

In both embodiments of the present invention, the vortex generators work in the same manner as when they are used alone.

In the first embodiment of the present invention, the trailing panel works in generally the same way as described in the Baker patent (U.S. Pat. No. 5,348,366 to Baker, et al.), except that the trailing panel is now mounted much closer to the base surface, and the combination provides greater base drag reduction. Due to the shorter mounting distance, the standing vortices trapped between the trailing panel and the base surface are greatly reduced in size, consume less energy in turbulence, and cause less base drag.

In the second embodiment of the present invention, the shortened boattail plates work in generally the same way as described in the Bilanin patent (U.S. Pat. No. 4,682,808 to Bilanin), except that the shortened boattail plates are now much shorter, the standing vortices trapped between the shortened boattail plates and the base surface of the bluff body are greatly reduced in size, and the combination provides greater base drag reduction.

To provide more detail, there appear to be several mechanisms at work to account for the increased base drag reduction achieved by the present invention. These drag reduction mechanisms are similar for both embodiments of the present invention, but they will be described separately for each of the two embodiments in order to insure clarity.

For the first embodiment of the present invention, using vortex generators in combination with a trailing panel:

First; the vortex generators mounted just ahead of the trailing edges of the bluff body, energize air in the passing turbulent boundary layer, inducing it to turn inward more quickly after passing the trailing edges of the bluff body, to help fill in the low pressure wake behind the bluff body.

Second; when the mounting distance of the trailing panel is optimized so that the edges of the trailing panel intercept the separated shear surfaces, the relatively fast moving fluid just outside the shear surfaces passes just outside the edges of the panel, and provides fluid to help fill in the partial vacuum in the space just behind the trailing panel, increasing the fluid pressure against the rear surface of the trailing panel. This can also be viewed in terms of a more favorable velocity vector at the point where the fluid passes just outside the edges of the trailing panel.

Third; the relatively slower moving and lower pressure fluid inside the separated shear surfaces passes just inside the edges of the trailing panel, and is recirculated back toward the base surface of the bluff body. This lower pressure recirculating fluid is thus confined to the space bounded by the base surface, the forward surface of the trailing panel, and the separated shear surfaces. This effectively minimizes the size of the recirculation bubbles, or standing vortices, reduces their energy consumption, and therefore reduces base drag.

Fourth; the smaller mounting distance for the trailing panel and smaller recirculation bubbles result in much shorter separated shear surfaces, thus reducing the surface area of the separated shear surfaces where the pumping action that produces the negative pressure coefficient on the base surface is produced. The total surface area of these separated shear surfaces is reduced to about one third half the surface area of the separated shear surfaces that exists when a trailing panel is used without vortex generators.

For the second embodiment of the present invention, using vortex generators in combination with shortened boattail plates:

First; the low drag vortex generators mounted just ahead of the trailing edges of the bluff body energize air in the passing turbulent boundary layer, inducing it to turn inward more quickly after passing the trailing edges of the bluff body, to help fill in the low pressure wake behind the bluff body.

Second; the shortened boattail plates plates separate the large area of relatively higher pressure fluid near the center of the base surface, from the relatively lower pressure fluid in the smaller areas between the trailing edges of the bluff body and the boattail plates, thus increasing the average fluid pressure against the base surface and decreasing base drag.

Third; when the lengths of the shortened boattail plates are optimized so that the rear edges of the plates intercept the separated shear surfaces, the relatively fast moving fluid just outside the shear surfaces passes just behind the rear edges of the plates and provides fluid to help fill in the partial vacuum in the space enclosed by the rearward extending panels, further increasing the average fluid pressure against the base surface. This can also be viewed in terms of a more favorable velocity vector at the point where the fluid passes just behind the rear edges of the shortened boattail plates.

Fourth; the relatively slower moving and lower pressure fluid inside the separated shear surfaces impinges the shortened boattail plates just ahead of their rear edges, and is recirculated back toward the base surface of the bluff body. This lower pressure recirculating fluid is thus confined to the space bounded by the base surface, the outer surfaces of the boattail plates, and the separated shear surfaces. This effectively minimizes the size of the recirculation bubbles, reduces their energy consumption, and therefore reduces base drag.

Fifth; the shortened boattail plates and smaller recirculation bubbles result in much shorter separated shear surfaces, thus reducing the surface area of the separated shear surfaces where the pumping action that produces the negative pressure coefficient on the base surface is produced. The total surface area of these separated shear surfaces is reduced to something less than half the surface area of the separated shear surfaces that exists when full length boattail plates are used without vortex generators.

Conclusions, Ramifications and Scope
Conclusions

The invention provides greater base drag reduction on large boxy highway vehicles than any previously known method or device, with the possible exception of full length boattails, which are too long to be practical. The invention achieves its goals while complying with applicable federal regulations on trailer underride bars. The invention is also small and simple enough to be economically attractive, and is easily folded or retracted to allow unimpeded access to rear cargo doors.

Ramifications

Fuel savings in the range of ten percent can be expected from typical large trucks, with slightly higher savings from the most favorable applications. The potential fuel savings from long haul semi-trailer trucks alone is over one billion gallons per year, if the invention is widely adopted.

Comparable fuel savings can be expected from smaller highway vehicles such as minivans, despite their smaller size, due to their greater numbers. The invention may be less effective on some current models of minivans, and other highway vehicles with bluff rear end shapes, which often lack clean trailing edges. However, future models can easily be adapted to accommodate the invention, If the manufacturers so desire, thus enabling greater fuel savings.

Scope

The invention has the potential for widespread use on all types of highway vehicles with bluff rear end shapes. These include long haul semi-trailer trucks and other large trucks, smaller delivery trucks, motor homes, minivans, pickup trucks with caps, station wagons, enclosed utility trailers, camper trailers, truck campers, and even sport utility vehicles.

The invention can also be used on other types of bluff bodies such as railway vehicles and the superstructures of fast ships and boats. It can also be used to reduce the base drag of a backstep, such as the rear end of roof mounted air conditioner units on the roofs of motor homes. Other potential applications may be found in the air ducts of large heating and air conditioning systems.

Other potential applications include reducing the hydrodynamic base drag at the rear of slow moving watercraft with displacement hulls, including freight barges used on inland waterways.

These and other potential applications, and numerous minor improvements to the basic invention, which are evident to persons skilled in the art of fluid dynamics, are assumed to fall within the scope of the present invention.

What I claim as my invention is:

1. An apparatus for reducing the fluid-dynamic base drag of a bluff body (20) moving through a fluid (21) and creating, at the rear of the body, a low pressure wake having an outer wake perimeter, which bluff body (20) has a substantially flat rear base surface (25), a pair of opposed side surfaces (22A and 22B), and opposed top and bottom surfaces all joined with said rear base surface at side, top and bottom trailing edges (24), respectively, so as to form a box container (30), said apparatus comprising:

V shaped vortex generators in a linear array (40) ahead of the trailing edges (24) of said bluff body (20) for generating counter rotating stream-wise vortices (27) in a fluid boundary layer (23) passing generally along said bluff body and creating from said layer separated shear surfaces (26) which turn sharply inward aft of said trailing edges (24);

boattail plates (50) inset and affixed a distance (18) from the top and side trailing edges (24); and rear edges on said boattail plates (50) sized to intercept the separated shear surfaces (26) at the outer perimeter of the low pressure wake, thereby providing maximum fluid-dynamic base drag reduction for said body.

2. The apparatus in accordance with claim 1 wherein the bluff body is a land vehicle.

3. The apparatus of claim 2 wherein the vortex generators are positioned with an open end facing toward a forward end of said vehicle; and the pointed end pointed toward the rear of said vehicle.

4. The apparatus of claim 2 wherein said land vehicle includes a truck body with a rear opening, and further comprising:

boattail plate hinging means allowing said plates to swing clear from said rear opening.

5. The apparatus of claim 2 wherein said truck body has a pair of swinging rear doors (36) vertically divided lengthwise top to bottom at about the center of the base surface, said apparatus further comprising:

means dividing the top boattail plate at the point of division of the doors such that opening of the doors allows said boattail plates to separate and travel away with the swinging doors.

6. The apparatus of claim 3, wherein said inset distance is about 8 to 9 percent of the lesser of the height or width of said rear base surface.

7. The apparatus of claim 1 wherein the height of said vortex generators is in the range of ¼ to ⅕ of the thickness of said local boundary layer.

8. Apparatus for reducing to a minimum the fluid-dynamic base drag of a bluff body moving through a fluid passing generally along said bluff body and creating, at the rear of the body, separated shear surfaces which define a low pressure wake having an outer wake perimeter, which bluff body has a substantially flat rear base surface with given height and width dimensions and a periphery of trailing edges, said apparatus comprising:

vortex generator means mounted adjacent to and forward of said periphery for generating counter-rotating stream-wise vortices in said fluid layer, which generators cause the separated shear surfaces to turned sharply inward thereby reducing the size of the low pressure wake; and edge means coupled to said base surface and inset from said trailing edges for intercepting said separated shear surfaces at the outer perimeter of said low pressure wake, namely, at a distance behind said base surface of about $\frac{1}{6}$ th to $\frac{1}{8}$ th of said given height or width dimension, whichever is less.

* * * * *